Figure 1:
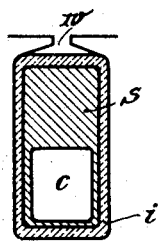

R. RÜDENBERG.
CONDUCTOR AND ELECTRIC MACHINERY PROVIDED WITH IT.
APPLICATION FILED OCT. 18, 1916. RENEWED NOV. 16, 1920.

1,370,156.  Patented Mar. 1, 1921.

Inventor:
Reinhold Rüdenberg
By Knight Bros
his Attorneys

UNITED STATES PATENT OFFICE.

REINHOLD RÜDENBERG, OF CHARLOTTENBURG, NEAR BERLIN, GERMANY, ASSIGNOR TO SIEMENS SCHUCKERTWERKE G. M. B. H., OF SIEMENSTADT, NEAR BERLIN, GERMANY, A CORPORATION OF GERMANY.

CONDUCTOR AND ELECTRIC MACHINERY PROVIDED WITH IT.

1,370,156.     Specification of Letters Patent.     Patented Mar. 1, 1921.

Original application filed September 18, 1913, Serial No. 790,533. Patent No. 1,285,398, dated November 19, 1918. Divided and this application filed October 18, 1916, Serial No. 126,320. Renewed November 16, 1920. Serial No. 424,510.

*To all whom it may concern:*

Be it known that I, REINHOLD RÜDENBERG, a German citizen, and resident of Charlottenburg, near Berlin, Germany, have invented certain new and useful Improvements in Conductors and Electric Machinery Provided with Them, of which the following is a specification.

My invention relates to electric machinery and more particularly to electric conductors to be used in connection with the same. The particular object of my invention is to provide conductors adapted to greatly improve the electric effect of the machine carrying them.

As is well known to those skilled in the art, conductors disposed in slots of the rotors of electric machines require being cooled artificially in order to get rid of the heat generated within them by the electric current, said heat causing the electric effect of such machines to be less than what it would be, if this heat was quickly disposed of without accumulating in the machine structure. As I have further shown in Patent No. 1,285,398, granted Nov. 19, 1918, on my copending application for Patent Ser. No. 790,533, filed Sept. 18, 1913, of which the present application is a division, the same difficulties arise in connection with the stators of certain classes of electric machines, such as high voltage dynamos, where the conductors embedded in the slots of the stator are surrounded by comparatively thick-walled tubes of insulating material which form a particularly strong hindrance to the escape of the heat to the outside.

Attempts have been made to dispose of this heat by making the conductors connected with rotating parts of electric machinery as well as with transformers, electric heaters and the like, hollow or in other words to provide such conductors with a centrally located channel extending longitudinally through them, air or another cooling medium such as water being caused to pass through said channels and thus to abduct the heat generated within by the passage of electric current. As I have shown in my co-pending application mentioned above, an arrangement of this sort in connection with the stator of a high voltage dynamo will cause the electric effect of such a dynamo to be increased by about 30 per cent.

I have now ascertained that this arrangement can still be considerably improved by disposing the cooling channel eccentrically or asymmetrically within the conductor, especially in the sense that the conductor has a greater cross-sectional area adjacent the outer opening of the slot in which it is embedded than adjacent the bottom of said slot, or, in other words, according to the present invention I thus dispose the cooling channel in the conductor, so that two diametrically opposite parts of the channel walls are different in thickness.

I do this in order to obtain more favorable conditions of working with regard to the suppression of the skin effect within the conductor. As is well known to those skilled in the art, in a conductor mounted in a slot of an electric machine the electric current passing through said conductor is concentrated toward the open end of the slot with the result that in the parts of the conductor adjacent to the bottom of the slot little or no current will flow and in most cases even reverse currents will be generated at these places. This effect becomes most conspicuous in the case where a plurality of conductors are arranged within the slot above each other. Now, by disposing the cooling channel spoken of before within the conductors in such a manner that the conductor section is divided in two parts, a comparatively broad solid part and a rather thin-walled hollow part, I am able to obtain the most favorable conditions with regard to the skin effect inasmuch as in a machine carrying within its slots conductors of the kind described with the cooling channels near the bottom of the slots and the solid sectional part of the conductors adjacent to the slot openings, by far the greater area will be presented to the electric current, accumulating owing to the skin effect, near the slot openings, while owing to the bottom part of the conductor being hollow, no reverse current to speak of can be generated in that part.

As a matter of course the same applies to a plurality of conductors disposed one above the other in slots of an electric machine, for in each conductor almost all the current passing through it will accumulate in the part nearest the slot opening.

In order to illustrate my invention I have shown in the drawings accompanying the specification and forming part thereof a number of conductors of different form provided with cooling channels disposed in accordance with my invention, but I wish it to be understood that the conductors shown are merely meant to be examples not limiting my invention which may be applied with substantially equal effect to any kind of conductor or combination of conductors used in a similar manner.

In the drawing, Figures 1 to 4 are cross-sections of slots of a part of an electric machine, such as for instance the rotor or the stator of a high voltage dynamo, with conductors according to my invention embedded therein.

Referring now to the drawings, Fig. 1 shows a conductor of rectangular cross-section with a cooling channel $c$ eccentrically disposed within it so as to form a solid part $s$ of a sectional area approximately equal to the portion in which the channel is disposed, the walls surrounding said channel on three sides being rather thin. This conductor is surrounded by a thick-walled insulating tube $i$ and embedded with it in the slot $w$ in such a manner that the channel $c$ is nearest to the bottom and the solid part $s$ nearest to the opening of said slot.

Figure 2:
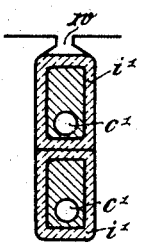

In the modification shown in Fig. 2 two conductors of rectangular section are disposed within a slot $w$, each conductor being formed similarly to the one shown in Fig. 1 with the exception of the cooling channels $c^1$, $c^1$ which in this case have a circular section, the solid area in this case being a little greater. Each of these conductors is surrounded by a thick-walled insulating tube $i^1$ and the two conductors with their insulating tubes are disposed one above the other in the slot $w$ in such a manner that the channel $c^1$ of the lowermost conductor is placed near the bottom of the slot and the channel $c^1$ of the uppermost conductor is located adjacent to the top of the lowermost conductor.

Figure 3:
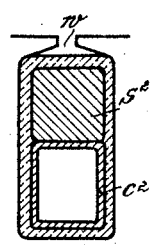

In Fig. 3 a compound conductor made in two pieces is shown surrounded by a single insulating tube, a rectangular hollow conductor $c^2$ being disposed in a slot $w$ below a solid conductor $s^2$ of substantially equal breadth and height.

Figure 4:
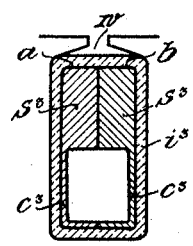

The conductor shown in Fig. 4 is similar in outer shape to the one shown in Fig. 1, the only difference being that here the conductor is made in two halves $a$ and $b$, each half showing one half of the solid part $s^3$ and one half of the hollow part $c^3$ of the conductor which is therefore similar to a conductor according to Fig. 1 cut in two halves in a vertical direction. The two parts $a$ and $b$ of this conductor are again held together by a thick-walled insulating tube $i^3$ and are disposed within the slot $w$ in such a manner that the hollow part $c^3$ is nearer to and the solid part $s^3$ is farther away from the bottom of said slot.

I claim:—

1. An electric conductor provided with an eccentrically disposed longitudinal channel.

2. A hollow electric conductor having its hollow and solid parts disposed eccentrically.

3. An electric conductor bar provided with an eccentrically disposed longitudinal channel.

4. An electric conductor in two pieces provided with an eccentrically disposed channel.

5. A composite electric conductor consisting of a solid conductor and a hollow conductor.

6. A composite electric conductor consisting of a metal bar and a metal tube.

7. In an armature of a dynamo electric machine having transverse slots, hollow conductors in said slots having their hollow and solid portions disposed eccentrically.

8. In an armature of a dynamo electric machine having transverse slots, hollow conductors having the hollow and solid portions disposed eccentrically and being located in said slots with the solid portions facing the periphery of the armature.

REINHOLD RÜDENBERG.